United States Patent
Weadon et al.

[19]

[11] Patent Number: 6,104,621
[45] Date of Patent: Aug. 15, 2000

[54] TORSIONAL HINGING MECHANISM

[75] Inventors: Mark W. Weadon, Apex, N.C.; William H. Jennings, Bedford, Va.

[73] Assignee: Ericsson, Inc., Research Triangle Park, N.C.

[21] Appl. No.: 09/109,230

[22] Filed: Jun. 30, 1998

[51] Int. Cl.[7] ..................................................... H04B 1/03
[52] U.S. Cl. .......................... 361/814; 361/800; 361/801; 361/802; 361/803; 361/814; 361/756; 361/754; 455/90
[58] Field of Search ..................................... 361/814, 801, 361/802, 803, 798–800, 824, 825, 754–756

[56] References Cited

U.S. PATENT DOCUMENTS

| | | | |
|---|---|---|---|
| 5,274,882 | 1/1994 | Persson | 16/303 |
| 5,303,291 | 4/1994 | Takagi et al. | 379/433 |
| 5,606,730 | 2/1997 | Rush et al. | 455/90 |
| 5,636,275 | 6/1997 | Takagi et al. | 379/433 |

*Primary Examiner*—Jeffrey Gaffin
*Assistant Examiner*—Tuan Dinh
*Attorney, Agent, or Firm*—Coats & Bennett, P.L.L.C.

[57] ABSTRACT

A wireless communications device, such as a cellular telephone, is provided with a torsional hinging mechanism for rotatably coupling a flip cover to the device's main body. The torsional hinging mechanism both minimizes lateral loading and causes the flip cover to automatically assume the open position when released. One, and preferably two, torsional axles interconnect the main body to the flip cover. One end of the torsional axle is engaged by the main body so as to prevent relative rotation therebetween, for example by fitting the end through a retaining slit in the main body. The opposite end of the torsional axle is engaged by the flip cover so as to prevent relative rotation therebetween, for example by fitting a keyed end into a keyed hole. When the flip cover is in the closed position, the torsional axle is rotationally loaded so as to urge the flip cover towards the open position. Optionally, the one or more of the torsional axles may include an acoustic passage for acoustically connecting the flip cover to a microphone in the main body when the flip cover is in the open position.

16 Claims, 4 Drawing Sheets

TORSIONAL HINGING MECHANISM

FIELD OF THE INVENTION

The present invention relates generally to wireless communications devices, and more particularly to a torsional hinging mechanism for connecting a movable flip cover to a main body of a wireless communications device.

BACKGROUND OF THE INVENTION

Wireless communications devices, such as cellular telephones, have proven very popular. Over time, these devices have been reduce greatly in size and weight. Today, it is common for a cellular phone to have a small main body and a flip cover coupled to the main body via a hinge mechanism. It is desirable for the flip cover to remain in the closed position until the user desires to use the device, when the flip cover is opened, exposing a keypad. In the open position, the device is typically long enough to stretch from a person's mouth to their ear. The user speaks into the flip cover and listens to the opposite end of the main body. Once in the open position, it is desirable for the flip cover to remain open until deliberately closed by the user.

Due to the small size and desire for light weight, plastic parts are typically employed for the hinge mechanisms linking the flip cover and the main body. One common configuration is to use a flip cover that connects to the main body via two coaxial hinges. The first hinge is typically a simple shaft and collar arrangement that performs the dual function of allowing relative rotational motion and provides an acoustic coupling path between the flip cover and the main body. The second hinge is typically a simple shaft and collar arrangement without acoustic coupling characteristics. Further, it is typical for at least one of the hinges to include some sort of detent arrangement so as to hold the flip cover in a predetermined opened position when opened. One type of detent arrangement is through the use of cammed surfaces and lateral force applied through a common coil spring.

The present methods of hinging suffer from two drawbacks. First, many of the hinge arrangements create lateral loads on the flip cover. For instance, the cam and spring arrangement described above produces a lateral load against the flip cover. Typically, such a lateral load is asymmetrically applied to the flip cover, because one hinge typically is not laterally loaded so as to allow for acoustic coupling. Due the asymmetrical loading, the hinge cover may not fit properly, causing aesthetic dissatisfaction and/or significant stress may be placed on the flip cover, leading to undesirable fatigue and failure. Second, the available hinge mechanisms do not cause the flip cover to automatically assume the open position. That is, the flip covers must be moved into the open position, rather than springing into an open position when released from a catch.

In light of the above, there remains a need for a hinging arrangement that does not produce lateral loading and that causes the flip cover to automatically assume the open position when released. Further, it would be desirable if such a hinging arrangement optionally allowed for acoustic coupling between the flip cover and the device's main body.

SUMMARY OF THE INVENTION

The present invention provides a wireless communications device, such as a cellular telephone, having a torsional hinging mechanism which does not produce lateral loading and which causes the flip cover to automatically assume the open position when released. One, and preferably two, torsional axles interconnect the main body to the flip cover. The torsional axles preferably include a generally cylindrical hub having a generally flat section thereon and an elongate arm. The end of the elongate arm is engaged by the main body so as to prevent relative rotation therebetween, for example by fitting the end of the elongate arm through a retaining slit in the main body. The opposite end of the torsional axle, the hub, is engaged by the flip cover so as to prevent relative rotation therebetween, for example by fitting the hub into a keyed hole having a flat section which corresponds to the flat section on the hub. When the flip cover is in the closed position, the torsional axle is rotationally loaded so as to urge the flip cover towards the open position. Preferably, the main body includes a latch or similar means for resisting the opening force of the torsional axle so as to keep the flip cover in the closed position until released by the user.

Optionally, the one or more of the torsional axles may include an acoustic passage for acoustically connecting the flip cover to a microphone in the main body when the flip cover is in the open position. Preferably, the acoustic passage enters the hub from an axial location on the end of the hub away from the arm and exits at a circumferential location on the cylindrical portion of the hub. When the flip cover is in the open position, this exit aligns with an opening in the main body which leads to the microphone.

DETAILED DESCRIPTION

Figure 1:
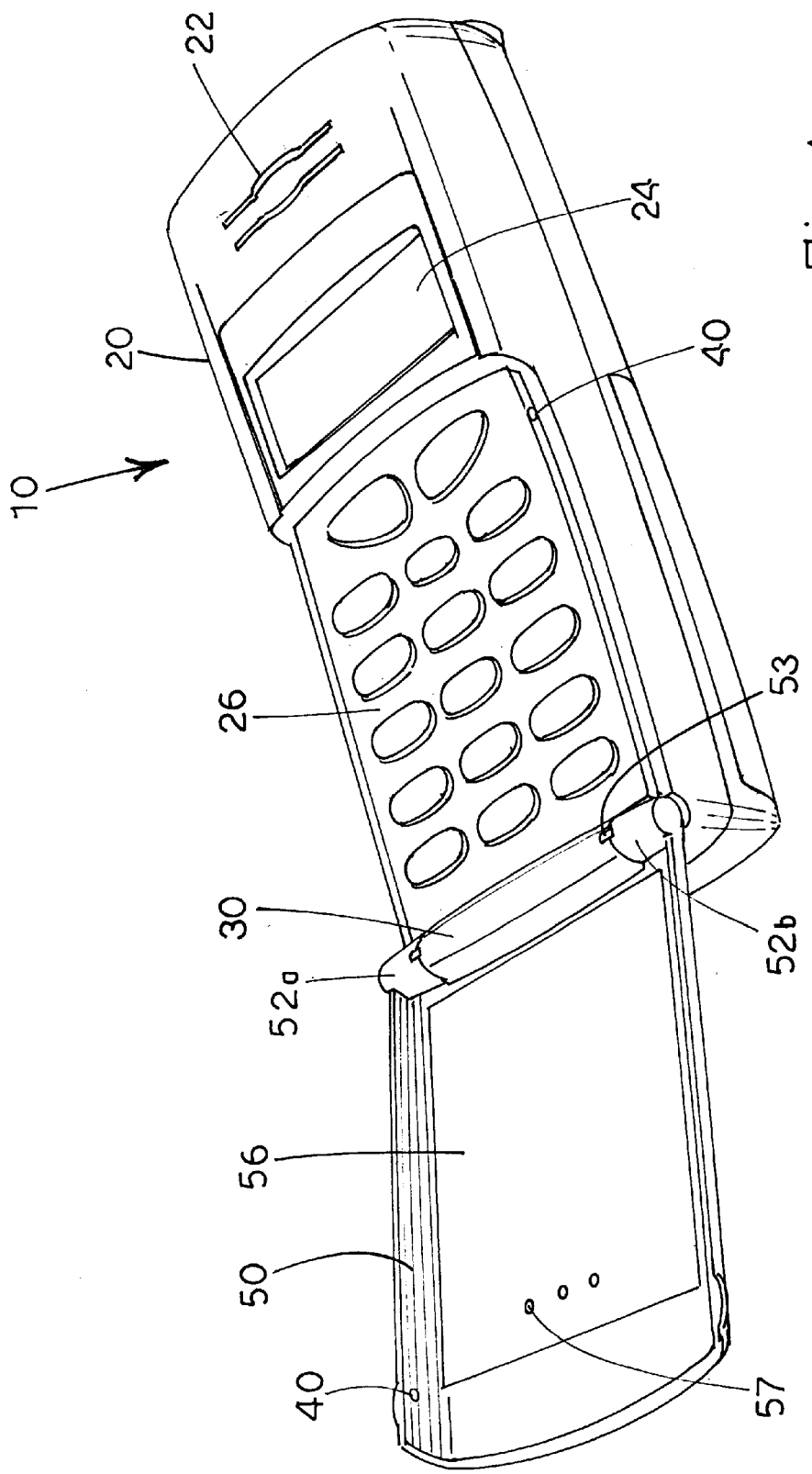
FIG. 1 is a perspective view of a wireless communications device incorporating the present invention.

The present invention utilizes at least one, and preferably two, torsional axles 70 to provide rotational opening force to the flip cover 50. The torsional axles 70 cause the flip cover 50 to spring open to its normally open position when a latch 40 or other retaining means holding the flip cover 70 is released. In one preferred embodiment, at. least one of the torsional axles 70 is provided with an acoustic passage 86 which forms part of an acoustic pathway leading to the microphone 60.

Figure 2:
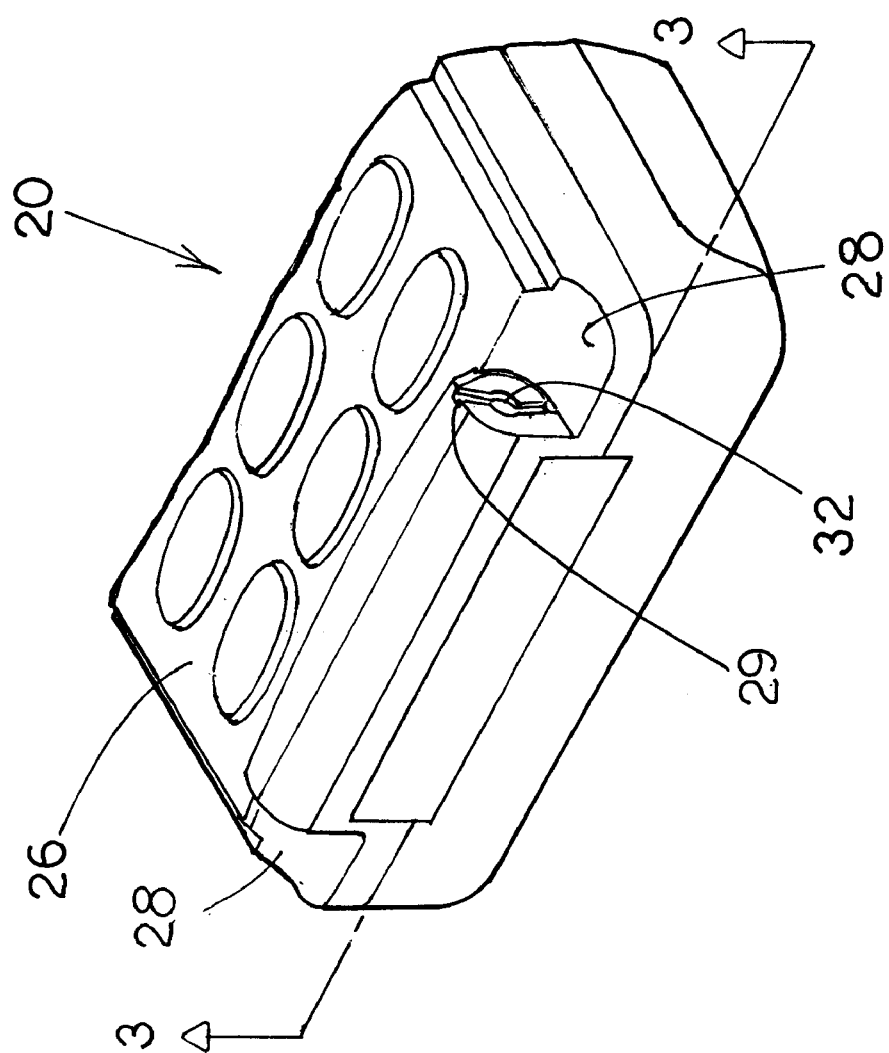
FIG. 2 is a partial perspective view of the lower portion of the wireless communications device of FIG. 1 with the flip cover removed.
Figure 3:
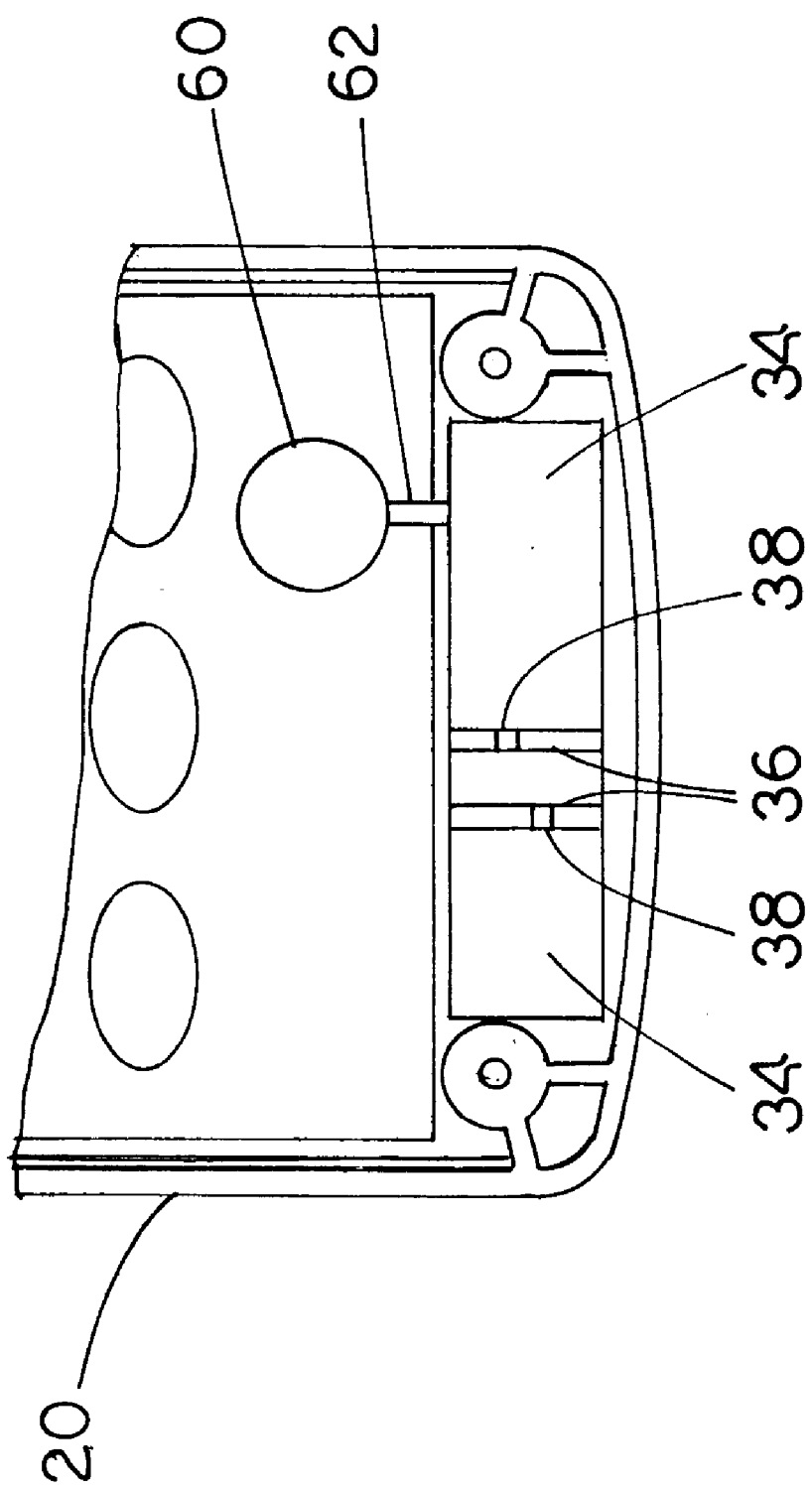
FIG. 3 is a bottom view of a portion of the main body of the wireless communications device of FIG. 2 along line 3—3.
Figure 4:
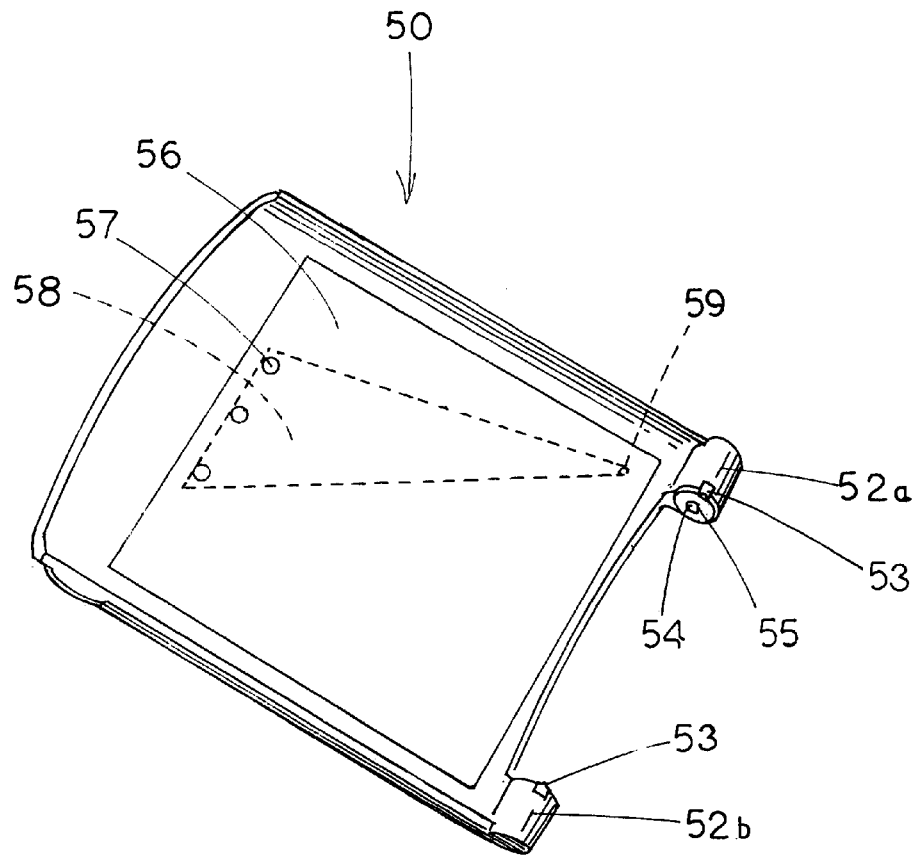
FIG. 4 is a perspective view of a flip cover suitable for use with the present invention.

Referring to FIG. 1, a wireless communications device 10, such as cellular or satellite telephone, typically includes a main body 20 which houses the device's electronics. The front of the main body 20 typically includes on its upper portion a speaker outlet 22 and a display 24, in its middle portion a keypad 26 for entry of phones numbers and other control information, and on its lower portion a raised area 30 that extends across the central part of the width of the main body 20. As best seen in FIG. 2, beside each end of the raised area 30 (i.e. on the left and right) is are curved hollows 28 which extend to the edge of the main body 20. On each end of the raised area 30 there is a axle hole 32. As best seen in FIG. 3, on the underside of the raised area 30 is a cavity 34 having near its middle two thin ribs 36 having vertical slits 38 therein.

Connected to the main body 20 is a flip cover 50 which, in the closed position, covers the keypad 26. The flip cover 50 is best seen in FIG. 1 and FIG. 3. For ease of reference, the portion of the flip cover 50 near the upper portion of the main body 20 when the flip cover 50 is closed will be called the top and the opposite end will be called the bottom. On the bottom end of the flip cover 50 are two arms, one on the left 52a and one on the right 52b. These arms 52a,52b each include a keyed hole 54 having a flat portion of their circumference 55 which provides the keying action. When the flip cover 50 is placed over the main body 20, the two arms 52a,52b fit into the curved hollows 28 and surround the raised area 30 of the main body 20. Optionally associated with the arms 52a,52b may be suitable detents 53 which releasably engage corresponding recesses 29 on the adjacent portions of the raised area 30 so as to encourage the flip cover 50 to stop in a predetermined position when opened.

Figure 5:
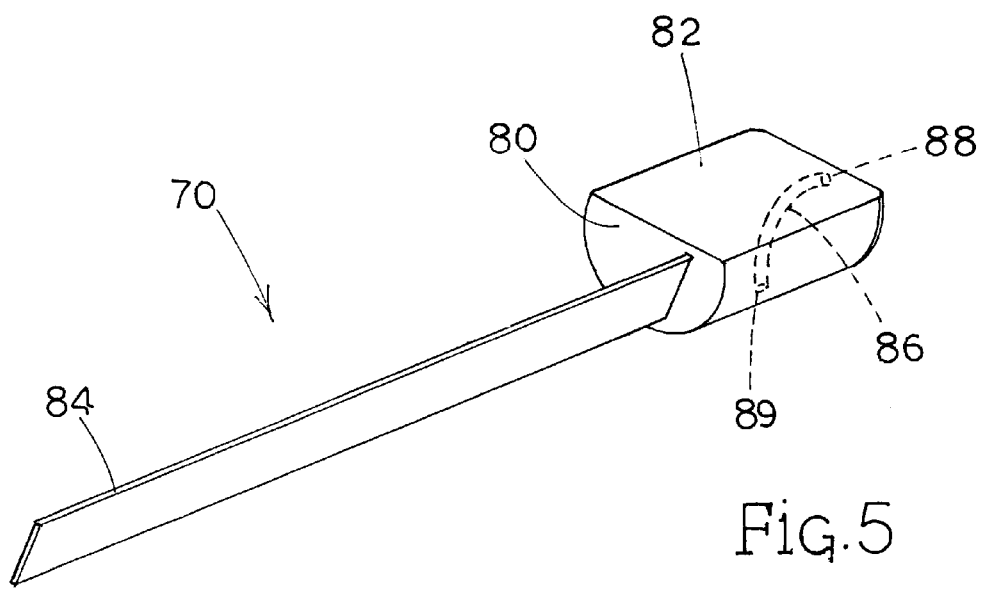
FIG. 5 is a perspective view of one embodiment of a torsional axle of the present invention.

The flip cover 50 is connected to the main body 20 via at least one, and preferably two, torsional axles 70. As best seen in FIG. 5, the torsional axle 70 includes a hub 80 and an arm 84. The hub 80 is a truncated cylindrical shape having a portion of its circumference being a flat surface 82. Preferably, the edge of the hub 80 is chamfered or otherwise tapered so as to facilitate the insertion of the torsional axle 70 into an axle hole 32 and keyed hole 54. The arm 84 is thin and elongated. In the preferred embodiment, the arm 84 is a metal stamping of suitable spring material such as beryllium copper and the hub 80 is plastic and insert molded around the arm 84.

The torsional axles 70 are placed in the cavity 34 formed on the underside of the raised area 30 of the main body 20. The flip cover 50 is placed in the open position relative to the main body 20 such that the keyed holes 54 line up with the axle holes 32. Then the hubs 80 of the torsional axles 70 are inserted through the axle holes 32 and into the keyed holes 54. The flat portion 82 of the hubs 80 should align with the flat portion 55 of the keyed holes 54. The arms 84 of the torsional axles 70 are then inserted into the vertical slits 38 in the ribs 36. In this position, the arms 84 are straight; that is, they have no torsional load.

When the flip cover 50 is closed, the hubs 80 are forced to rotate with the flip cover 50. That is, the flat portion 82 of the hub 80 stays in alignment with its respective flat portion 55 of the keyed hole 54 as the flip cover 50 is rotated. Because end of the torsional axle 70 arm 84 is held stationary by the vertical slits 38, there is relative rotation between the ends of the torsional axle 70, which the torsional axle 70 resists. Thus, when the flip cover 50 is closed, the torsional axle 70 generates a rotational load against the flip cover 50, urging the flip cover 50 to open.

A latch 40 or other catch mechanism should be used to hold the top end of the flip cover 50 against the rotational force exerted by the torsional axle 70 when the flip cover 50 is in the closed position. Any one of a wide variety of latches 40 well known in the art may be used for this purpose. It is preferred that the latch force be in the range of 5–10 Newtons so that flip cover 50 will be securely held in the closed position, but can be released without undue effort.

To open the flip cover 50, the user releases the latch 40. The rotational force from the torsional axles 70 causes the flip cover 50 to rotate to the open position. This action can be described as springing open the flip cover 50. In this position, the flip cover 50 is ready for normal operation.

It should be noted that it is preferred, but not required, for the torsional axles 70 to allow the flip cover 50 to be opened beyond the normal open position. That is, the torsional axles 70 do not need to have some sort of rotational stop. This is so that an open wireless communications device 10 may be placed upside down on a flat surface, such as a tabletop, and pressed flat without breaking. Thus, the design of the torsional axles 70 should preferably take into consideration that the arms 84 may be flexed both forwards and backwards.

The use of the torsional axles 70 to rotatably connect the flip cover 50 to the main body 20 does not apply any lateral load to the flip cover 50. Instead, a rotational load is applied. Thus, undesirable part-to-part misfits and stresses are minimized. Further, in a preferred embodiment, two torsional axles 70 are employed, one on each side, thereby symmetrically loading the flip cover 50 and allowing for continued operation if one of the torsional axles 70 breaks.

In addition to their mechanical aspects, the torsional axles 70 may form a portion of an acoustic pathway. In wireless communications devices 10, such as cellular telephones, it is common for the microphone 60 to located in the main body 20. However, the portion of the device closest to the user's mouth in the normal open position is the top of the flip cover 50 (rotated down to be furthest from the main body 20), not the main body 20. It is typically undesirable for the microphone 60 to be too sensitive, as unwanted environmental noise may be introduced. Therefore, it is desirable to route the sound from the top of the flip cover 50 to the bottom of the flip cover 50, through the hinge area, and to the microphone 60 in the main body 20.

To facilitate this, the underside of the flip cover 50 typically includes a wedge shaped recessed area 58 that funnels down towards one arm 52a,52b or the other. The left arm 52a will be used for purposes of illustration. At the point of the recessed area 58 is a passage 59 that leads to the axial center of the left arm 52a. A flip insert 56 covers the recessed area 58, thereby forming a substantially enclosed sound chamber. The flip insert 56 includes a plurality of voice holes 57 which allow sound waves to enter the sound chamber. An acoustic passage 86 through the left torsional axle 70 routes the sound to an opening 62 in the main body 20. From this opening 62, the sound is routed to the microphone 60.

The hub 80 of the left torsional axle 70 includes a curved L-shaped acoustic passage 86 with an entry 88 at the axial center of the hub 80 farthest from the arm 84 and an exit 89 along the circumference of the hub 80. The exit 89 is circumferentially located in relation to the flat key portion 82 of the hub 80 such that the exit 89 is aligned with the opening 62 in the main body 20 when the flip cover 50 is in the normal open position. Preferably, the acoustic passage 86 is a constant diameter and any curves in the acoustic passage 86 have a gentle constant radius.

When the flip cover 50 is closed, the exit 89 will not be aligned with the opening 62. Thus, the microphone 60 should not be receiving sound energy from the acoustic pathway. Neither should the microphone 60 be receiving sound energy from the acoustic pathway 86 when the flip cover 50 is opened beyond its normal open position, because, when opened beyond its normal open position, the exit 89 should be rotated out of alignment with the opening 62.

A wireless communications device 10 may be constructed according to the present invention with the following:

A main body 20 having a raised area 30 of 33 mm and 3.5 and having axle holes 32 of 4.7 mm diameter on each end and ribs 36 of 3 mm thickness and 0.25 mm wide slits 38.

Two torsional axles 70 having hubs 80 of 4.5 mm diameter, tapered at approximately 5 degrees and a length of 4 mm and having a flat portion 82 of twenty to thirty degrees; the torsional axles 70 having arms 84 of 25 mm×0.25 mm dimensions made from stainless steel insert molded into the hubs 80; at least one of the torsional axle hubs 80 having an acoustic passage 86 of 1 mm diameter and a 90° turn of 1 mm radius;

Keyed holes 54 of 4.6 mm diameter in the flip cover 50, having flat portions 55 of twenty to thirty degrees.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communications device, comprising:
    a) a main body having at least one axle hole therein;
    b) a flip cover operable between a closed position and an open position and having at least one keyed hole therein;
    c) at least one torsional axle; said torsional axle rotationally fixed at one end and extending through said axle hole and through said keyed hole so as to rotatably connect said flip cover to said main body;
    d) wherein said torsional axle is rotationally loaded when said flip cover is in said closed position and urges said flip cover towards said open position; and
    e) wherein said main body includes a microphone and wherein said torsional axle includes an acoustic passage connecting said flip cover to said microphone.

2. The device of claim 1 wherein
    a) said main body includes an opening disposed between said acoustic passage and said microphone;
    b) said acoustic passage includes an exit therefrom;
    c) said exit is aligned with said opening when said flip cover is in said open position;
    d) said exit is not aligned with said opening when said flip cover is in said closed position.

3. A wireless communications device, comprising:
    a) a main body having at least one axle hole therein;
    b) a flip cover operable between a closed position and an open position and having at least one keyed hole therein;
    c) at least one torsional axle; said torsional axle rotationally fixed at one end and extending through said axle hole and through said keyed hole so as to rotatably connect said flip cover to said main body;
    d) wherein said torsional axle is rotationally loaded when said flip cover is in said closed position and urges said flip cover towards said open position; and
    e) wherein said torsional axle includes a generally cylindrical hub having a generally flat section thereon and an elongate arm.

4. The device of claim 3 wherein said main body further includes at least one retaining slit and wherein said slit engages said arm and said hub extends through said axle hole and said keyed hole.

5. The device of claim 3 wherein said main body engages said fixed end of said torsional axle.

6. The device of claim 5 wherein said main body further includes at least one retaining slit and wherein said torsional axle further includes an elongate arm and wherein said slit engages said arm to prevent relative rotation therebetween.

7. A wireless communications device comprising:
    a) a main body;
    b) a flip cover having two arms and operable between a closed position and an open position; said arms having keyed holes therein;
    c) a hinge mechanism rotatably connecting said flip cover to said main body; said hinge mechanism including:
        i) a raised area on said main body having axle holes therein;
        ii) a plurality of retaining slits on the underside of said raised area;
        iii) a first torsional axle extending from one of said slits through one of said axle holes and through one of said keyed holes;
        iv) a second torsional axle extending from a second of said slits through the other of said axle holes and through the other of said keyed holes;
    d) wherein said first torsional axle and said second torsional axle are rotationally loaded when said flip cover is in said closed position.

8. The device of claim 7 wherein said first torsional axle and said second torsional axle are rotationally unloaded when said flip cover is in said open position.

9. The device of claim 7 further including a latch securing said flip cover to said main body when said flip cover is in said closed position.

10. The device of claim 7 wherein said first torsional axle and said second torsional axle each include a generally cylindrical hub having a generally flat section thereon and an elongate arm.

11. The device of claim 10 wherein:
    a) said main body includes a microphone and wherein said hub of said torsional axle includes an acoustic passage connecting said flip cover to said microphone;
    b) said main body includes an opening disposed between said acoustic passage and said microphone;
    c) said acoustic passage includes an exit therefrom;
    d) said exit aligns with said opening when said flip cover is in said open position.

12. The device of claim 11 further including a flip insert overlying a portion of said flip cover so as to form an acoustic chamber therebetween and wherein said acoustic chamber acoustically connects to said acoustic passage.

13. A wireless communications device comprising:
    a) a main body including a microphone;
    b) a flip cover having two arms and operable between a closed position and an open position; said arms having keyed holes therein;
    c) a hinge mechanism rotatably connecting said flip cover to said main body; said hinge mechanism including:
        i) a raised area on said main body having axle holes therein;
        ii) two retaining slits on the underside of said raised area;
        iii) a first torsional axle extending from one of said slits through one of said axle holes and through one of said keyed holes;
        iv) a second torsional axle extending from the other of said slits through the other of said axle holes and through the other of said keyed holes;
        v) said first torsional axle and said second torsional axle each having a hub and an elongate arm;
    d) wherein said first torsional axle and said second torsional axle each include a generally cylindrical hub having a generally flat section thereon and an elongate arm and i) wherein at least one of said hubs includes an acoustic passage connecting said flip cover to said microphone;

ii) said main body includes an opening disposed between said acoustic passage and said microphone;

iii) said acoustic passage includes an exit therefrom;

iv) wherein said exit aligns with said opening when said flip cover is in said open position;

e) a latch securing said flip cover to said main body when said flip cover is in said closed position;

f) a flip insert overlying a portion of said flip cover so as to form an acoustic chamber therebetween and wherein said acoustic chamber connects to said acoustic passage;

g) wherein said first torsional axle and said second torsional axle are rotationally unloaded when said flip cover is in said open position and rotationally loaded when said flip cover is in said closed position.

14. A wireless communications device comprising:

a) a main body;

b) a flip cover operable between a closed position and an open position;

c) a first torsional axle rotatably coupling said flip cover to said main body; said first torsional axle having a first end and a second end;

d) means associated with said main body for engaging said first end of said first torsional axle so as to prevent relative rotation therebetween;

e) means associated with said flip cover for engaging said second end of said first torsional axle so as to prevent relative rotation therebetween;

f) wherein said first torsional axle is rotationally loaded when said flip cover is in said closed position.

15. The device of claim 14 further including;

a) a second torsional axle rotatably coupling said flip cover to said main body; said second torsional axle having a first end and a second end;

b) means associated with said main body for engaging said second end of said second torsional axle so as to prevent relative rotation therebetween;

c) means associated with said flip cover for engaging said second end of said second torsional axle so as to prevent relative rotation therebetween;

d) wherein said second torsional axle is rotationally loaded when said flip cover is in said closed position.

16. The device of claim 14 wherein said main body includes a microphone and an opening leading to said microphone and said first torsional axle includes an acoustic passage having an exit therefrom and wherein said exit aligns with said opening when said flip cover is in said open position.

* * * * *